United States Patent

[11] 3,573,391

[72] Inventors Akira Harada
Tokyo;
Shogo Nakayama, Suwa-shi, Japan
[21] Appl. No. 677,484
[22] Filed Oct. 23, 1967
[45] Patented Apr. 6, 1971
[73] Assignee Matsushita Electric Industrial Co., Ltd.
Kadoma-shi, Osaka, Japan
[32] Priority Oct. 25, 1966
[33] Japan
[31] 41/71110, 41/71111, 41/71112 and 41/71113

[54] CHANNEL SWITCHING MEANS FOR A CARTRIDGE-TYPE TAPE RECORDER

4 Claims, 7 Drawing Figs.

[52] U.S. Cl. ........ 179/100.2, 179/100.2CA
[51] Int. Cl. ........ G11b 21/08
[50] Field of Search ........ 179/100.2 (CA), 100.2 (MI), 100.2 (Z); 274/4 (A), 11 (A)

[56] References Cited

UNITED STATES PATENTS

| | | | |
|---|---|---|---|
| 2,933,319 | 4/1960 | Proctor | 179/100.2 |
| 3,372,937 | 4/1968 | Flint | 179/100.2 |
| 3,383,473 | 5/1968 | Schroter | 179/100.2 |
| 3,388,911 | 6/1968 | Wilson et al. | 179/100.2 |
| 3,400,227 | 9/1968 | Lear et al. | 179/100.2 |
| 3,485,959 | 12/1969 | Roys | 179/100.2 |

*Primary Examiner*—Bernard Konick
*Assistant Examiner*—Robert S. Tupper
*Attorney*—Stevens, Davis, Miller & Mosher

ABSTRACT: A cartridge-type tape recorder, wherein channel selection can be positively carried out through providing a single magnetic head, the magnetic head being mounted on a support plate urged in one direction by means of a pin provided perpendicularly with respect to the insert plane of the cartridge and an elastic member provided on a movable shaft fixed to the support plate, the support plate being maintained parallel to the plane of insertion of a tape cartridge, and a cam the peripheral surface of which is in rotational contact with the support plate at a position corresponding to the position of the movable shaft, thereby controlling the height of the magnetic head.

This specification discloses a channel switching means for a cartridge-type tape recorder using multichannel tape having a plurality of tracks, wherein the channel selection can be positively carried out through the use of a single magnetic head and the head is mounted on a support plate adapted for parallel motion by means of a spring and a pin perpendicularly provided with respect to the insert plane of the cartridge and a channel switching cam is rotatably provided contacting the support plate at a position corresponding to the said spring and the height of the magnetic head is controlled by the cam, thereby effecting the channel switching.

INVENTORS
AKIRA HARADA,
SHOGO NAKAYAMA,
BY Stevens, Davis, Miller & Mosher
ATTORNEYS

INVENTORS
AKIRA HARADA,
SHOGO NAKAYAMA,

BY Stevens, Davis, Miller & Mosher

ATTORNEYS

CHANNEL SWITCHING MEANS FOR A CARTRIDGE-TYPE TAPE RECORDER

BACKGROUND OF THE INVENTION

This invention relates to a channel switching means for cartridge-type tape recorders, and more particularly it pertains to such channel switching means for cartridge-type tape recorders using a multichannel tape having a plurality of tracks, wherein the channel selection can be carried out through the use of a single magnetic head.

In the conventional channel switching means for cartridge-type tape recorders of this type, the magnetic head is secured to the fore end of a lever for supporting the head.

For channel selection, said magnetic head supporting lever is moved upward or downward by rotating a head changeover cam through a cam feed mechanism actuated by means of a solenoid energized in accordance with a command from a tape.

However, such conventional channel switching means for cartridge-type tape recorders have such drawbacks that since the magnetic head is arranged to be rotated about a shaft, the contact angle of the magnetic head with respect to the tape is nonuniformly varied depending upon the channel selection, so that the recording or playback characteristics tend to become nonuniform and the tape tends to be scratched.

SUMMARY OF THE INVENTION

It is a primary object of this invention to provide a channel switching means for cartridge-type tape recorders free from the aforementioned drawbacks.

Another object of this invention is to provide a cartridge-type recorder, comprising a magnetic head, a support plate urged in one direction and adapted for parallel motion, said magnetic head being mounted on said support plate, and a head switching cam provided in a position toward which said support plate is urged, said head switching cam being disposed in engagement with said support plate to set the position of said magnetic head, thereby effecting channel selection.

Still another object of this invention is to provide a channel switching means for cartridge-type tape recorders, comprising a magnetic head, a support plate urged in one direction and adapted for parallel motion, said magnetic head being mounted on said support plate, a head switching cam provided at a position toward which said support plate is urged, said head switching cam being disposed in engagement with said support plate to set the position of said magnetic head thereby effecting channel selection, and contact means provided on said support plate to adjust the position where said cam contacts said support plate.

A further object of this invention is to provide a cartridge-type tape recorder, comprising a magnetic head, a support plate urged in one direction and adapted for parallel motion, said magnetic head being mounted on said support plate, a head switching cam provided in a position toward which said support plate is urged, said head switching cam being disposed in engagement with said support plate to set the position of said magnetic head thereby effecting channel selection, and an indicator mechanically coupled to said head switching cam to indicate the position of rotation of said cam corresponding to the position of the magnetic head, said cam being adapted to be rotated through manual rotation of said indicator.

A still further object of this invention is to provide a channel switching means for cartridge-type tape recorders, comprising a magnetic head, a support plate urged in one direction and adapted for parallel motion, said magnetic head being mounted on said support plate, a head switching cam provided at a position toward which said support plate is urged, said head switching cam being disposed in engagement with said support plate to set the position of said magnetic head thereby effecting channel selection, a bearing supporting one end of said head switching cam, an engaging projection or recess formed in the other end portion of said head switching cam, an indicator carried by a base plate to indicate the position of rotation of said cam corresponding to the position of said magnetic head, said cam being adapted to be rotated through manual rotation of said indicator, a rotating shaft mechanically coupled to said indicator, a recess or projection provided on said rotating shaft so as to be disposed in engagement with said projection or recess, and a spring loaded in the connection portion between said cam and said rotating shaft to urge said cam toward said bearing.

Other objects, features and advantages of this invention will become apparent from the following description taken in conjunction with the accompanying drawings.

DESCRIPTION OF THE PREFERRED EMBODIMENT

Figure 1:
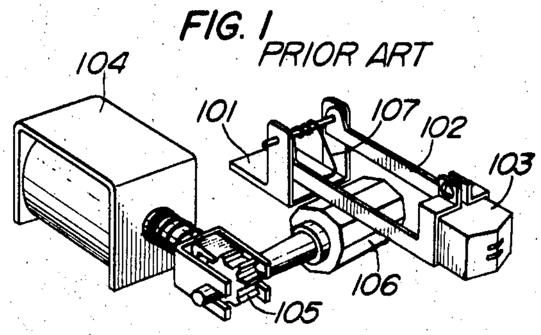
FIG. 1 PRIOR ART
FIG. 1 is a perspective view showing the major portion of a conventional channel switching means for cartridge-type tape recorders.

First, description will be made of a conventional channel switching means for cartridge-type tape recorders with reference to FIGS. 1 and 2. Referring to FIG. 1, a magnetic head 103 is secured to the fore end of a magnetic head supporting lever 102 having its base portion carried by a support member 101. The channel selection for the magnetic head 103 is carried out by upwardly or downwardly moving the magnetic head supporting lever 102, which is normally downwardly biased, by rotation of a head switching cam 106 through a cam feed mechanism 105 actuated by means of a solenoid 104 which is energized in accordance with a command from a tape or that from a pushbutton switch. The reference numeral 107 denotes a spring for urging the magnetic head 103 downward.

Figure 2:
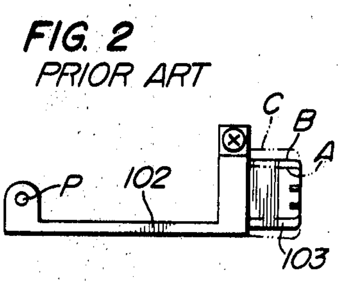
FIG. 2 PRIOR ART
FIG. 2 is a plan view illustrating the operating state of the magnetic head shown in FIG. 1.
Figure 3:
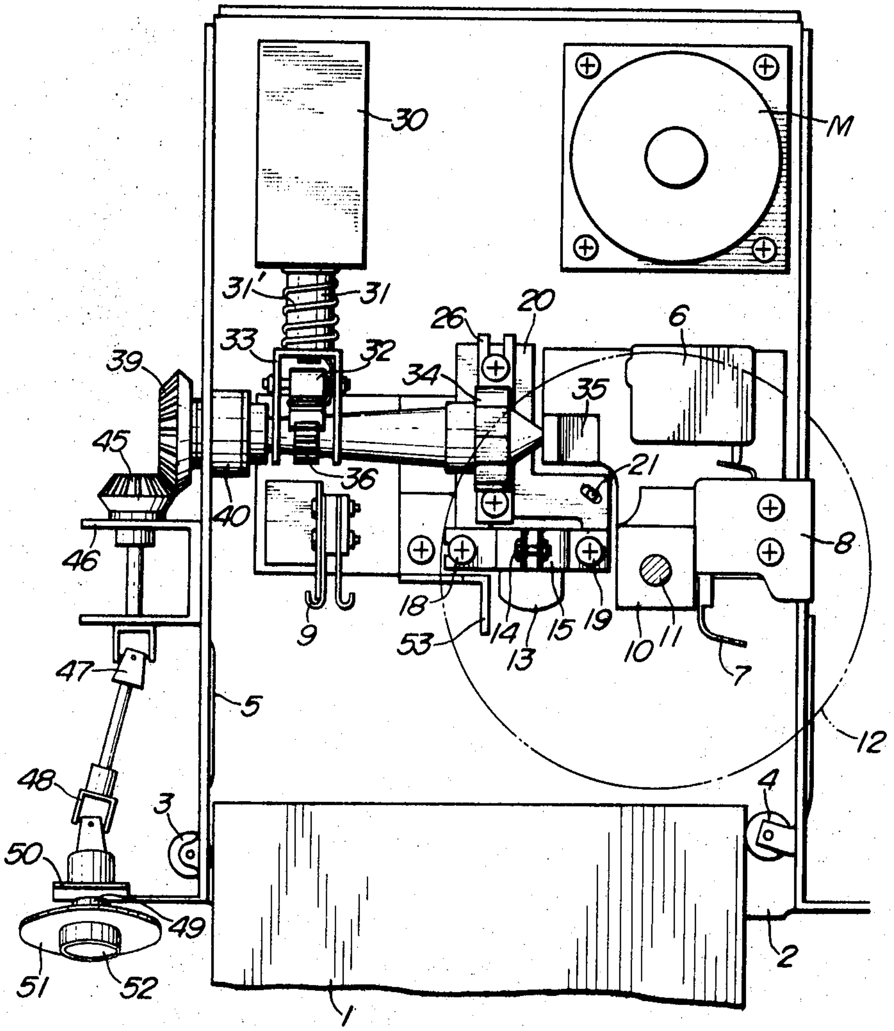
FIG. 3 is a top plan view of the channel switching means for cartridge-type tape recorders according to an embodiment of this invention.
Figure 4:
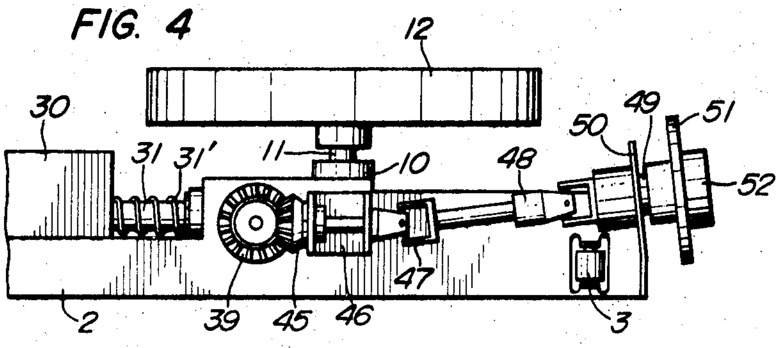
FIG. 4 is a left side view thereof.

As previously described, however, such channel switching means for cartridge-type tape recorders have drawbacks in that the contact angle of the magnetic head 103 with respect to the tape is nonuniformly changed depending upon the channel selection since the magnetic head 103 is rotated about a shaft P so as to be displaced as indicated at A, B and C in FIG. 2.

Figure 5:
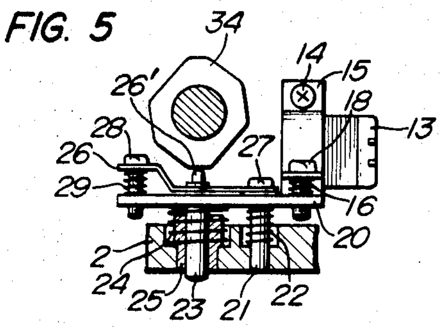
FIG. 5 is a side view showing the relationship between the magnetic head and the head switching cam as shown in FIG. 3.
Figure 6:
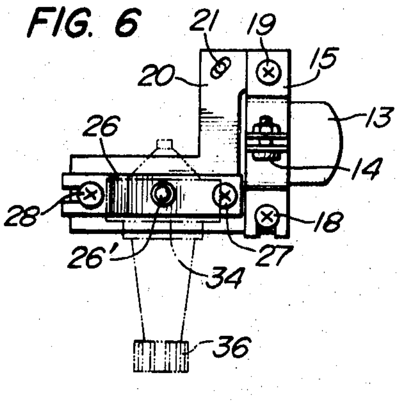
FIG. 6 is a top view thereof.

An embodiment of this invention will now be described with reference to FIGS. 3 to 7, wherein the reference numeral 1 represents a cartridge accommodating therein an eight-track endless tape, and 2 a base plate provided on the opposite sides thereof with rollers 3 and 4 for guiding the cartridge 1 and on one side thereof with a guide projection. The reference numeral 6 represents a power source switch, 7 a power source switch lever abutting against the fore end portion of the cartridge 1 to turn on the power source switch 6 upon insertion of the cartridge, 8 a switch lever stop, and 9 electric contact pieces adapted to be shorted with a conductive foil provided on a tape, thereby detecting the terminating end of the tape. The electric contact pieces 9 are fixed to the base plate 2 and actuated by a solenoid 30 which will be described hereinafter. The reference numeral 10 indicates a capstan bearing, and 11 a capstan having its upper end connected with a flywheel 12 which is adapted to impart a rotating force from a motor M to the capstan 11. The reference numeral 13 represents a stereophonic magnetic head, 14 a fitting for holding the magnetic head 13, and 15 a lever for adjusting the balance of the magnetic head, the center portion of the lever 15 being secured to the fitting 14, one end thereof being fixed to a magnetic head supporting plate 20, which will be described later, by means of a screw 18 having a spring 16 provided thereon and the other end thereof being fixed to the support plate 20 by means of a screw 19. The magnetic head supporting plate 20 is upwardly urged by a spring 24 having one end thereof supported on the base plate and surrounding a downwardly projecting main shaft 23, as shown in FIG. 5.

Furthermore, the head supporting plate 20 is moved upwardly or downwardly by means of a pin 21 provided on the base plate 2 and having a spring 22 wound thereon. In this case, the spring 24 has a higher tension than the spring 22. The reference numeral 25 denotes a bearing for the main shaft 23, and 26 a lever having one end thereof fixed to the magnetic head supporting plate 20. The lever 26 is provided in the center portion thereof with a projection 26′ in engagement with a head switching cam 34, which will be described hereinafter, and has the other end thereof fixed to the support plate 20 by means of a fixing means 28 having a spring 26 provided thereon. The height of the projection 26′ can freely be adjusted with respect to the support plate 20.

Figure 7:
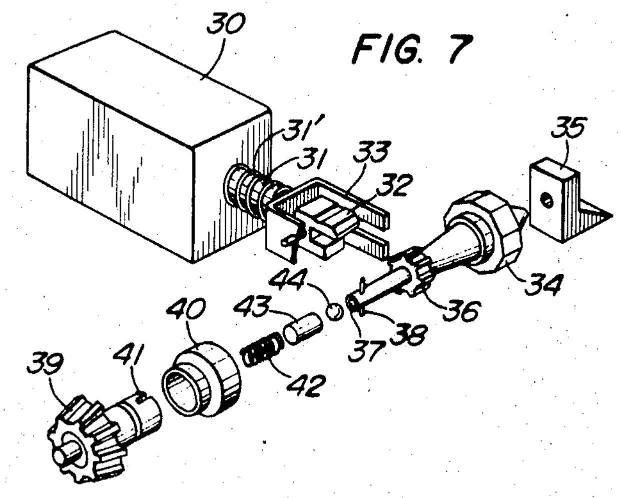
FIG. 7 is an exploded perspective view showing the relationship between the solenoid and the head switching cam as shown in FIG. 3.

The solenoid 30 is energized when the electric contact pieces 9 contact the conductor portion provided on the tape so as to be shorted with said conductor portion, and it has a movable shaft 31 which is provided with a feed nail 32 downwardly urged by a guide lever 33 and a spring 31′ provided on the shaft 31, as shown in FIG. 7. The reference numeral 34 indicates a head switching cam of which the bottom face is always disposed in contact with the projection 26′ of the lever 26. The head switching cam 34 is concentrically provided with a ratchet wheel 36 to be engaged by the feed nail 32 of the solenoid 30, and it has one end thereof supported on a bearing 35 and the other end thereof provided with a recess 37 and projecting pieces 38. A bevel gear 39 secured to the base plate 2 and supported by a bearing 40 is formed with a recess (not shown) and a groove 41 in which is fitted a projection 38 of the head switching cam 34. The reference numeral 42 represents a spring loaded in the recess of the bevel gear 39, 43 a ball receptacle, and 44 a ball through which the elastic force of the spring 42 is imparted to the head switching cam 34 to urge the latter toward the bearing 35. The reference numeral 45 denotes a bevel gear having one end portion thereof supported on a bearing 46 and intermeshing with the bevel gear 39, 47 and 48 universal joints, and 49 a shaft supported by a bearing 50 fixed to the base plate. The shaft 49 is mechanically connected with the bevel gear 45. To the shaft 49 are mounted an indicator 51 for indicating the position of the magnetic head 13 and an operating thumb 52.

As in the conventional case, the feed nail 32 is positively disposed out of engagement with the ratchet wheel 36 when the solenoid 30 is energized, and when the solenoid 30 is deenergized to be returned to its original position, the ratchet wheel 36 is rotated one step by the feed nail 32 to which the elastic force of the spring 31 is imparted. In this case, however, the cam 34 is rotated only in one direction by the feed mechanism. Therefore, by manually rotating the thumb 52 in that direction to cause the bevel gear 39 to be rotated through the universal joints 47 and 48, the ratchet wheel 36 and head switching cam 34 can be rotated as in the case where the solenoid 30 is energized. The reference numeral 53 represents a tape guide plate.

A pinch roller (not shown) which is disposed in engagement with the capstan 11 to transport the tape is provided in the cartridge 1, and it is enabled to be disposed into engagement with the capstan 11 by a compression force produced when the cartridge 1 is deeply inserted between the guide rollers 3 and 4. A conductor piece is provided between the starting and terminating ends of the tape accommodated in the cartridge.

Description will now be made of the operation of the device according to this invention.

By inserting the cartridge 1 between the guide rollers 3 and 4 until it has its fore end placed into contact with the power source switch lever 7, the power switch 6 is turned on by the lever 7. Thus, the motor is driven to rotate the capstan 11 through the flywheel 12. At the same time, the electric circuits such as the amplifier circuits and the like are rendered operative. If the tape in the cartridge 1 is placed into contact with the electric contact pieces 9, magnetic head 13 and capstan 11, then the tape is transported laterally across the tip portion of the magnetic head 13 at a predetermined speed by means of the capstan 11 and pinch roller (not shown) provided in the cartridge. In this way, recording or playback is carried out by means of the magnetic head 13.

In such state, when the transportation of the tape in the cartridge 1 is completed once, the conductor provided between the starting and terminating portions of the tape is brought into contact with the electric contact pieces 9 so that the latter are momentarily shorted therewith. Thus, a current is supplied to the solenoid 30 so that the movable shaft 31 is attracted thereto, with a result that the feed nail 32 is disengaged from the ratchet wheel 36. In this way, the feel nail will now be intermeshed with the next forward tooth of the ratchet wheel 36. Upon deenergization of the solenoid 36, the ratchet wheel 36 is rotated by the feed nail 32, so that the head switching cam 34 is rotated one step. Thus, the position (height) of the projection 26′ of the lever 26 where it contacts the head switching cam 34 is varied, so that the magnetic head supporting plate 20 is vertically guided by the upward elastic force of the spring 24 and pushed up or down to said position while assuming the state that it is placed parallelly with respect to the base plate 2. Concurrently, the position of the magnetic head 13 is also changed in accordance with the movement of the support plate 20. Thus, by previously adjusting a stud 28 so that each contact position between the head switching cam 34 and the projection 26′ corresponds to each channel of the tape, it is possible that the position of the magnetic head is changed through rotation of the head switching cam 34 so that the magnetic head is selectively enabled to be associated with each channel. Now, assume that stereophonic playback operation is being effected by picking up the signals in, for example, the channels 1 and 5 of the tape by means of the stereophonic head, then playback of the channels 2 and 6 or 4 and 8 can be effected by rotating the cam 34 one step.

On the other hand, the bevel gear 39 is also likewise rotated through rotation of the head switching cam 34, so that the indicator 45 is rotated through the bevel gear 45 and universal joints 47 and 48. Thus, by setting the indications of the indicator 45 so that they correspond to the respective positions of the magnetic head 13, it is possible to easily determine from the indicator those channels with which the magnetic head is now engaged.

Consider the case where it is desired that during playback of certain channels, other different channels be reproduced. In such case, the thumb 52 is rotated in accordance with the indication of the indicator 49 so that the rotating force is imparted to the ratchet wheel 36 through the universal joints 48 and 47 and bevel gears 45 and 39 to cause the feed nail to intermesh with the corresponding tooth of the ratchet wheel 36, thereby rotating the head switching cam 34. Thus, the magnetic head supporting plate 20 and magnetic head 13 are correspondingly moved upward or downward. Consequently, the channel selection can be carried out manually as in the case where the solenoid 30 is energized.

In the foregoing, description has been made of the case where the magnetic head supporting plate 20 is urged upwardly by the elastic force of the spring 24 and the top position of the support plate 20 is set by the came. In the case where the support plate 20 is forced downwardly, too, similar operational effect can be produced by constructing the head switching cam head 34 correspondingly. Although the magnetic head 13 has been described as stereophonic one, use may likewise be made of a monaural-type head. In such case, too, it is only required that the head switching cam be constructed so that it can achieve multichannel selection.

As described above, in accordance with this invention, a magnetic head is mounted on a magnetic head supporting plate which is urged only in one direction by means of an elastic member such as spring or the like and capable of parallel motion, and a head switching cam disposed in engagement with said support plate is provided in a position toward which the compression force is imparted to said support plate, thereby setting the position of the magnetic head to effect channel selection. Since the magnetic head is maintained parallel with respect to a tape when the said head is moved upward or downward during the channel selection, the head is always positively disposed into contact with the tape, so that there occur no possibilities that the recording or playback characteristics become nonuniform as with the conventional devices and the tape is scratched. Furthermore, in accordance with the present invention, the head switching cam for effecting channel selection has one end thereof supported on a bearing and is provided at the other end with an engaging projection or recess, and a rotating shaft is mechanically coupled to an indicator supported on a base plate, said indicator being adapted to indicate that position of rotation of said cam which corresponds to the position of the magnetic head and manually rotate said cam. The rotating shaft is formed with a recess or projection which is adapted for engagement with said projecting or recess. A spring is loaded in the connection portion between said rotating shaft and said cam, thereby urging said cam toward the bearing. Thus, the cam adapted to set the position of the support plate supporting the magnetic head is positively held between the bearing and the rotating shaft coupled to the indicator.

In assembling, it is only required that a spring is loaded in the connection portion between the cam and one end of the rotating shaft, and that the cam be pushed toward the rotating shaft against the elastic force of the spring. Thus, the assembling of the device can easily be performed. Also, the channels which are recorded or reproduced can easily be determined from the channel indicator, thus facilitating desired channel selection.

We claim:

1. A channel switching means for a cartridge-type tape recorder, comprising, in combination: a support plate; means to move said support plate in a direction substantially parallel to the plane of a magnetic tape inserted into said recorder, said moving means including pin means disposed substantially parallel to said magnetic tape plane, and shaft means movable parallelly with respect to said magnetic tape plane, said pin means and shaft means operatively connected to said support means; magnetic head means mounted on said support plate, the plane of the face of said head means being disposed substantially perpendicularly to the plane of said support plate; and means to adjust said head means substantially parallel to said magnetic tape plane and to maintain the plane of said support plate substantially perpendicularly to said magnetic tape plane; said last-mentioned adjusting and maintaining means including cam means having a plurality of steps provided on the peripheral surface thereof, said cam means being disposed in operative relation with said pin means, and further including further pin means operatively associated with said support plate and a base plate of said recorder and spring means disposed on said further pin means, said spring means being operative to urge said support plate away from said base.

2. A channel switching means for cartridge-type tape recorders as defined in claim 1, further comprising: an adjusting plate having one end thereof fixed to said support plate, and means to adjust the height of said adjusting plate relative to said support plate; said cam means being disposed in operative engagement with said adjusting plate.

3. A channel switching means for cartridge-type tape recorders as defined in claim 1, further comprising rotatable shaft means coupled to said cam means by gear means, means coupled to said rotatable shaft means for manually rotating said cam means, and means for indicating the rotational position of said cam means.

4. A channel switching means for cartridge-type tape recorders as defined in claim 1, further comprising still further shaft means connected to said cam means, bearing means supporting one end of said still further shaft means, the other end thereof having a recess, said recess having contained therein a ball, and further spring means urging a ball receptacle toward said bearing.